US012227986B2

(12) United States Patent
Yun et al.

(10) Patent No.: US 12,227,986 B2
(45) Date of Patent: Feb. 18, 2025

(54) DOOR CLOSING SHOCK ABSORBER AND DOOR MECHANISM PROVIDED WITH THE SAME

(71) Applicants: Hyundai Motor Company, Seoul (KR); Kia Corporation, Seoul (KR)

(72) Inventors: Hyungin Yun, Seoul (KR); Chungsik Yim, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 369 days.

(21) Appl. No.: 17/838,518

(22) Filed: Jun. 13, 2022

(65) Prior Publication Data

US 2023/0175300 A1 Jun. 8, 2023

(30) Foreign Application Priority Data

Dec. 8, 2021 (KR) ........................ 10-2021-0174352

(51) Int. Cl.
*E05F 7/04* (2006.01)

(52) U.S. Cl.
CPC ...................................... *E05F 7/04* (2013.01)

(58) Field of Classification Search
CPC .. E05D 3/022; E05D 15/56; E05F 7/04; E05F 5/025; E05F 5/06; E05F 5/08
USPC .......... 296/193.01, 155; 16/82, 85; 292/194, 292/195, 202
See application file for complete search history.

(56) References Cited

U.S. PATENT DOCUMENTS

| | | | | | |
|---|---|---|---|---|---|
| 2,027,833 | A * | 1/1936 | Lefevre | E05D 3/18 | 16/358 |
| 2,629,892 | A * | 2/1953 | Slopa | E05D 3/022 | 16/245 |
| 6,149,222 | A * | 11/2000 | Schambre | E05D 3/10 | 16/334 |
| 7,143,473 | B2 * | 12/2006 | Matsuki | E05C 17/206 | 16/86 B |
| 7,156,454 | B1 * | 1/2007 | Dogan | B60J 5/06 | 16/83 |
| 9,545,834 | B2 * | 1/2017 | Choi | B60J 5/06 | |
| 9,777,811 | B2 * | 10/2017 | Choi | E05D 15/101 | |
| 10,443,282 | B2 * | 10/2019 | Bauer | E05D 15/1047 | |
| 12,018,524 | B2 * | 6/2024 | Yun | B60J 5/0477 | |
| 2015/0123424 | A1 * | 5/2015 | Anderson | B60J 5/06 | 296/155 |

* cited by examiner

*Primary Examiner* — Amy R Weisberg
*Assistant Examiner* — Veronica M Shull
(74) *Attorney, Agent, or Firm* — Morgan, Lewis & Bockius LLP

(57) ABSTRACT

A door closing impact absorber includes a main bracket, a rotation bracket rotatably connected to the main bracket, and a main bracket torsion elasticity portion coupling the main bracket and the rotation bracket to elastically support a relative rotation of the main bracket and the rotation bracket.

14 Claims, 11 Drawing Sheets

DOOR CLOSING SHOCK ABSORBER AND DOOR MECHANISM PROVIDED WITH THE SAME

CROSS-REFERENCE TO RELATED APPLICATION

The present application claims priority to Korean Patent Application No. 10-2021-0174352 filed on Dec. 8, 2021, the entire contents of which is incorporated herein for all purposes by this reference.

BACKGROUND OF THE PRESENT DISCLOSURE

Field of the Present Disclosure

The present disclosure relates to a vehicle body door. More particularly, the present disclosure relates to a door closing impact absorber and a door mechanism including the same.

Description of Related Art

The vehicle door includes a general door hinged to the vehicle body or pillar, a scissor door (or lambo door) that opens or closes by rotating the door upward, a butterfly door or gull wing door that opens or closes the door upper and outside, a sliding door that opens or closes the door in the longitudinal direction of the vehicle body, a coach door (or suicide door) in which the opening and closing directions of the front and rear doors are opposite and various forms of door are used.

In the case of an opposing door, when the door is closed, the door panel and the weather strip may not completely match. As a result, door shaking may occur, impact between the door and vehicle body may occur, and noise may occur.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door closing impact absorber configured for absorbing the impact when the opposite door is closed to prevent the shaking of the door, and a door mechanism including the same.

A door closing impact absorber according to various exemplary embodiments of the present disclosure may include a main bracket, a rotation bracket rotatably connected to the main bracket, and a main bracket torsion elasticity portion coupling the main bracket and the rotation bracket to elastically support a relative rotation of the main bracket and the rotation bracket.

The door closing impact absorber according to various exemplary embodiments of the present disclosure may further include a main bracket stopper for limiting the relative rotation of the main bracket and the rotation bracket.

The door closing impact absorber according to various exemplary embodiments of the present disclosure may further include a mounting bracket rotatably connected to the rotation bracket, and a mounting bracket torsion elasticity part to elastically support the relative rotation of the rotation bracket and the mounting bracket.

The door closing impact absorber according to various exemplary embodiments of the present disclosure may further include The door closing impact absorber according to various exemplary embodiments of the present disclosure.

The door closing impact absorber according to various exemplary embodiments of the present disclosure may further include an impact absorbing portion mounted on a second end portion of the main bracket.

A door mechanism according to various exemplary embodiments of the present disclosure may include the door closing impact absorber according to various exemplary embodiments of the present disclosure.

The door mechanism according to various exemplary embodiments of the present disclosure may further include a main bracket stopper for limiting the relative rotation of the main bracket and the rotation bracket.

The door mechanism according to various exemplary embodiments of the present disclosure may further include a mounting bracket rotatably connected to the rotation bracket, and a mounting bracket torsion elasticity part to elastically support the relative rotation of the rotation bracket and the mounting bracket.

The door mechanism according to various exemplary embodiments of the present disclosure may further include a mounting bracket stopper for limiting the relative rotation of the rotation bracket and the mounting bracket.

The mounting bracket may be mounted on the door.

The door mechanism according to various exemplary embodiments of the present disclosure may further include a door receiving groove concave formed inside the door so that the mounting bracket is accommodated therein.

The door receiving groove may be formed at the lower portion of the door.

The door mechanism according to various exemplary embodiments of the present disclosure may further include an impact absorbing portion mounted on a second end portion of the main bracket.

The door mechanism according to various exemplary embodiments of the present disclosure may further include a vehicle body receiving groove formed concave inwardly of the vehicle body and selectively contacting with the impact absorbing portion.

The main bracket may rotate in the opposite direction to the sliding direction of the door when the door is closed.

The rotation bracket may rotate in the sliding direction of the door when the door is closed.

The door may be an opposite door or an opposite swing door.

The door may be a rear door.

According to the door closing impact absorber and the door mechanism including the same according to various exemplary embodiments of the present disclosure, it is possible to prevent the shaking of the door by absorbing the impact when the opposite door is closed.

According to the door closing impact absorber and the door mechanism including the same according to various exemplary embodiments of the present disclosure, it is possible to suppress the noise generation by absorbing the impact when the opposite door is closed, so that it is possible to improve the marketability.

Furthermore, the effects which may be obtained or predicted by various exemplary embodiments of the present disclosure will be included directly or implicitly in the detailed description of various exemplary embodiments of the present disclosure. That is, various effects predicted according to various exemplary embodiments of the present disclosure will be included within a detailed description to be described later.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
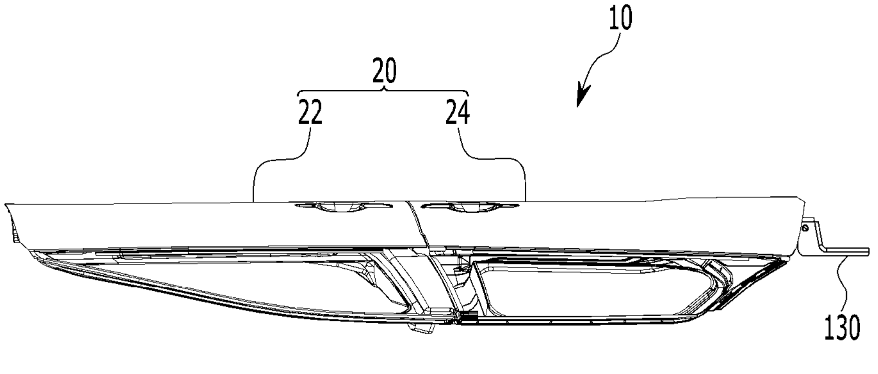
FIG. 1, FIG. 2, FIG. 3 and FIG. 4 are top plan views showing the operation of the vehicle body to which a door closing impact absorber and a door mechanism including the same according to various exemplary embodiments of the present disclosure may be applied.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown.

As those skilled in the art would realize, the described embodiments may be modified in various different ways, all without departing from the spirit or scope of the present disclosure.

To clearly explain an exemplary embodiment of the present disclosure, parts irrelevant to the description are omitted, and the same reference numerals are assigned to the same or similar elements throughout the specification.

Because the size and thickness of each component shown in the drawing are arbitrarily indicated for convenience of explanation, the present disclosure is not necessarily limited to that shown in the drawing, and the thickness is enlarged to clearly express various parts and areas.

Furthermore, in the detailed description below, the reason that the names of the components are divided into first, second, etc. is to classify the components in the same relationship, and it is not necessarily limited to the order in the following description.

Throughout the specification, when it is said that a certain part includes certain constituent elements, this means that other constituent elements may be further included, rather than excluding other constituent elements, unless specifically stated otherwise.

Furthermore, terms such as . . . part, . . . means described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

Various exemplary embodiments of the present disclosure will hereinafter be described in detail with reference to the accompanying drawings.

FIG. 1, FIG. 2, FIG. 3 and FIG. 4 are top plan views showing the operation of the vehicle body to which a door closing impact absorber and a door mechanism including the same according to various exemplary embodiments of the present disclosure may be applied.

In FIG. 1, FIG. 2, FIG. 3 and FIG. 4, for convenience of understanding, although a door closing impact absorber and a door mechanism including the same according to various exemplary embodiments of the present disclosure has shown an example applied to the pillar-less vehicle body to which the coach door (or suicide door) is applied, but is not limited thereto, the door closing impact absorber and the door mechanism including the same according to various exemplary embodiments of the present disclosure may be also applied to the vehicle body with a pillar.

That is, the door closing impact absorber and the door mechanism including the same according to various exemplary embodiments of the present disclosure may be applied to a vehicle body including a pillar, and may also be applied to a vehicle body to which an opposing door or an opposing swing door is applied.

In FIG. 1, FIG. 2, FIG. 3 and FIG. 4, the vehicle body 10 to which a door closing impact absorber and a door mechanism including the same may be applied includes a door 20.

The door 20 may include a front door 22 in front of the vehicle and a rear door 24 in the rear of the vehicle.

For convenience of understanding, an exemplary embodiment of the door closing impact absorber and the door mechanism including the same according to an exemplary embodiment of the present disclosure is referred to as an example applied to the rear door 24, but is not limited thereto, an exemplary embodiment of the door mechanism including the same may also be applied to the front door.

Drawing reference number 130 is a door mounting bracket that mounts the rear door 24 to the vehicle body 10, and the rear door 24 may perform a swing operation or a sliding operation based on the door mounting bracket 130.

Figure 4:
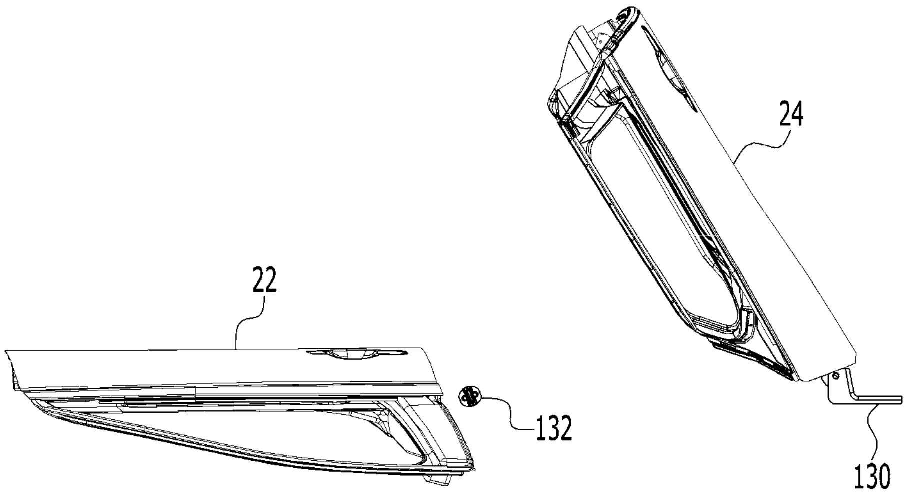

Reference numeral 132 shown in FIG. 4 is a guide striker, and when the rear door 24 performs a sliding operation, it is a configuration that guides the vehicle body length direction movement of the rear door 24.

Figure 2:
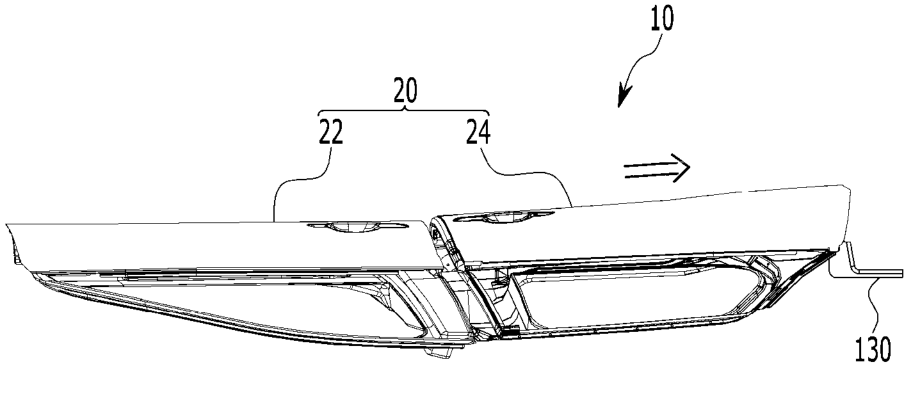
Figure 3:
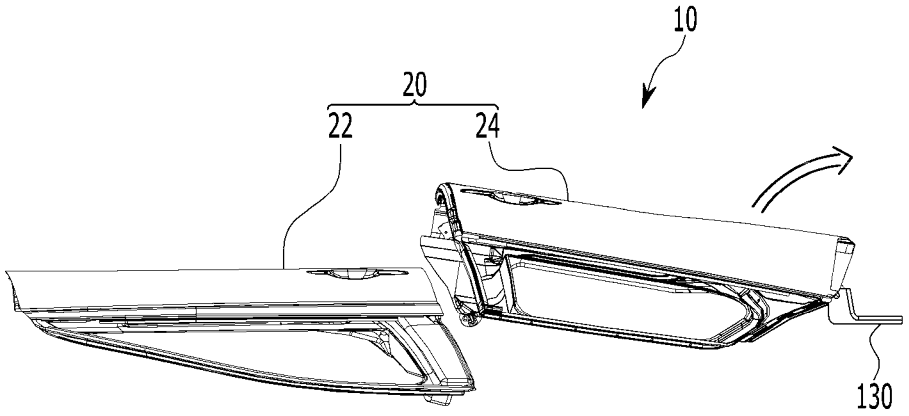

FIG. 1 shows the closed state of the rear door 24, FIG. 2 shows the sliding operation of the rear door 24, FIG. 3 shows the transition operation from the sliding operation of the rear door 24 to the swing operation, FIG. 4 shows the rear door 24 fully open state.

In the detailed description and claim of the present disclosure, the sliding operation refers to an operation in which the door 20 moves in the forward and backward directions of the vehicle body 10, and the swing operation refers to rotation of the door 20 around a rotation axis.

Figure 5:
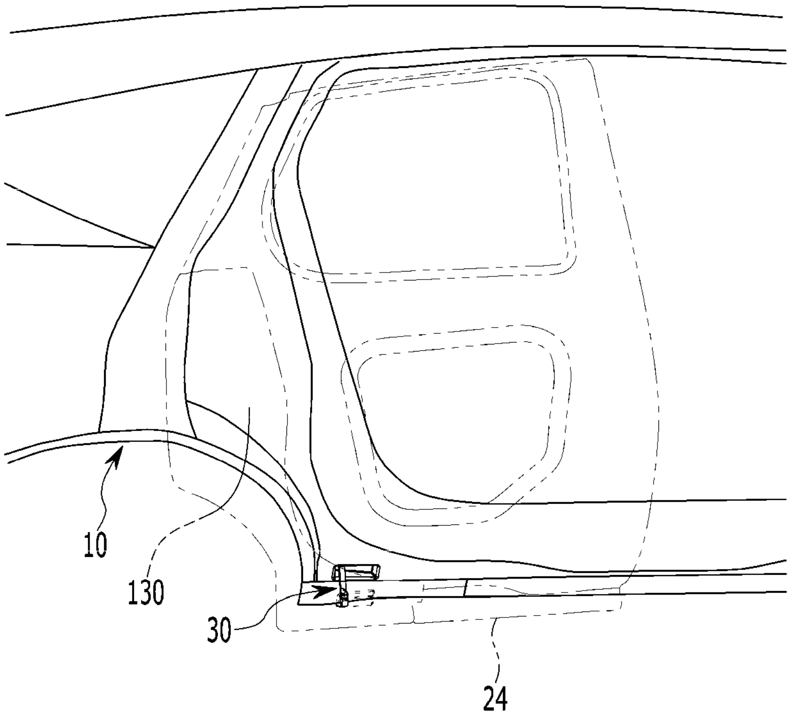
FIG. 5 is a side view of a vehicle body to which a door closing impact absorber and a door mechanism including the same according to various exemplary embodiments of the present disclosure may be applied.

FIG. 5 is a side view of a vehicle body to which a door closing impact absorber and a door mechanism including the same according to various exemplary embodiments of the present disclosure may be applied.

Referring to FIG. 5, the door closing impact absorber 30 according to various exemplary embodiments of the present disclosure may be mounted on the lower portion of the vehicle body 10.

That is, the door closing impact absorber 30 may be provided between the rear door 24 and the vehicle body 10 in the vicinity of the door mounting bracket 130.

Figure 6:
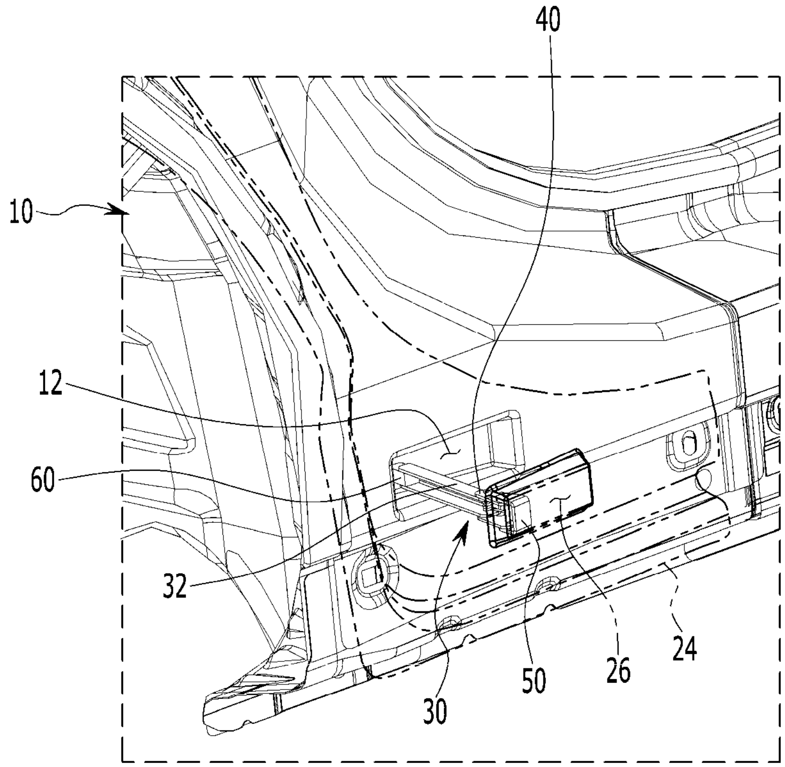
FIG. 6 is a perspective view of a vehicle body to which a door closing impact absorber and a door mechanism including the same according to various exemplary embodiments of the present disclosure may be applied.
Figure 7:
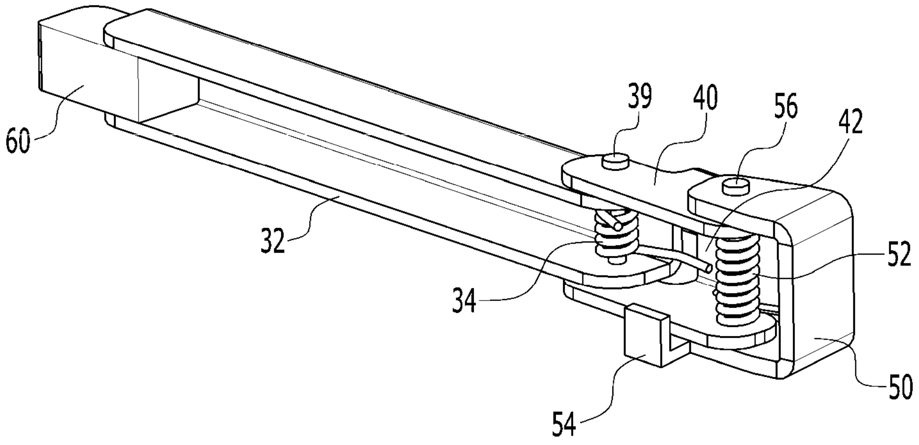
FIG. 7 and FIG. 8 is a perspective view showing the unfolding state of the door closing impact absorber according to various exemplary embodiments of the present disclosure.
Figure 8:
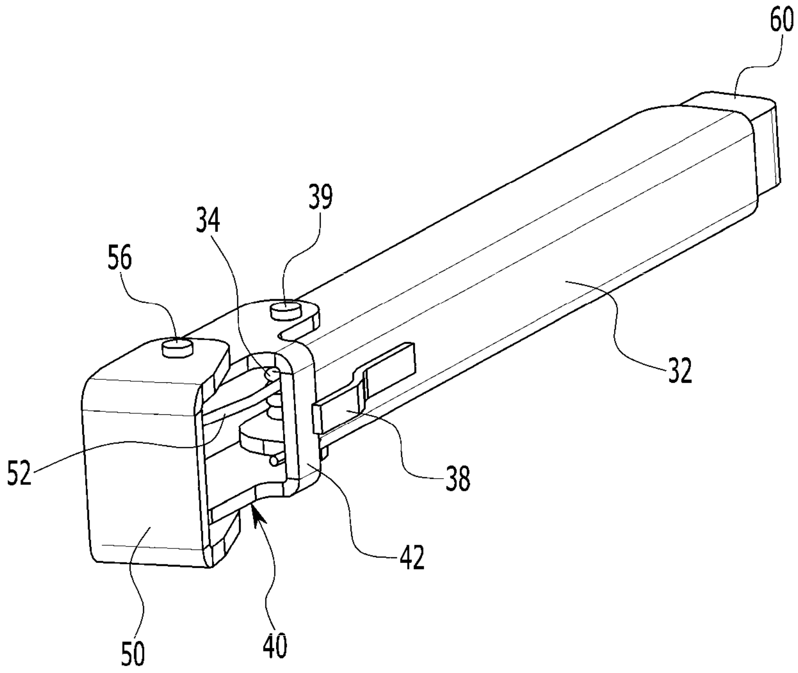

FIG. 6 is a perspective view of a vehicle body to which a door closing impact absorber and a door mechanism including the same his according to various exemplary embodiments of the present disclosure may be applied, and FIG. 7 and FIG. 8 is a perspective view showing the unfolding state of the door closing impact absorber according to various exemplary embodiments of the present disclosure.

Referring to FIG. 5, FIG. 6, FIG. 7, and FIG. 8, the door closing impact absorber 30 according to various exemplary embodiments of the present disclosure may include a main bracket 32, a rotation bracket 40 rotatably combined with the main bracket 32 and a main bracket torsion elasticity portion 34 elastically supporting the relative rotation of the main bracket 32 and the rotation bracket 40.

A main bracket rotation shaft 39 may be provided between the main bracket 32 and the rotation bracket 40 so that the main bracket 32 and the rotation bracket 40 are relatively rotatable.

As shown in the drawing, the main bracket torsion elasticity portion 34 may be a torsion spring of a spring type wound around the main bracket rotation shaft 39 to support the main bracket 32 and the rotation bracket 40 with elasticity. However, it is not limited thereto, and the main bracket torsion elasticity portion 34 may be configured in various forms, such as a torsion spring including a plate shape.

The door closing impact absorber 30 according to various exemplary embodiments of the present disclosure may further include a main bracket stopper 38 for limiting the relative rotation of the main bracket 32 and the rotation bracket 40.

A rotation bracket connection bar 42 is formed at the rotation bracket 40 and the main bracket stopper 38 may elastically support the rotation bracket connection bar 42.

Despite the rotating direction force of the main bracket torsion elasticity portion 34, the main bracket stopper 38 may only enable relative rotation of the main bracket 32 and the rotation bracket 40 in one direction.

The door closing impact absorber 30 according to various exemplary embodiments of the present disclosure may further include a mounting bracket 50 rotatably connected to the rotation bracket 40, and a mounting bracket torsion elasticity portion 52 to elastically support the relative rotation of the rotation bracket 40 and the mounting bracket 50.

A mounting bracket rotation shaft 56 may be provided between the rotation bracket 40 and the mounting bracket 50 to enable relative rotation of the rotation bracket 40 and the mounting bracket 50.

As shown in the drawing, the mounting bracket torsion elasticity portion 52 may be a torsion spring of a spring type wound around the mounting bracket rotation shaft 56 to support the rotation bracket 40 and the mounting bracket 50 with elasticity. However, the present disclosure is not limited thereto, and the mounting bracket torsion elasticity portion 52 may be configured in various forms, such as a torsion spring including a plate shape.

In the drawing, the main bracket torsion elasticity portion 34 and the mounting bracket torsion elasticity portion 52 have two separate configurations, but is not limited thereto, it may include a single torsion spring, etc.

The door closing impact absorber 30 according to various exemplary embodiments of the present disclosure may further include a mounting bracket stopper 54 for limiting the relative rotation of the rotation bracket 40 and the mounting bracket 50.

The door closing impact absorber 30 according to various exemplary embodiments of the present disclosure may further include an impact absorbing portion 60 mounted on one end portion of the main bracket 32.

The impact absorbing portion 60 may be made of various materials such as rubber, silicone, elasticity plastic, and the like. When the rear door 24 is closed, the impact absorbing portion 60 may mitigate the closing impact of the rear door 24 and the vehicle body 10.

Figure 9:
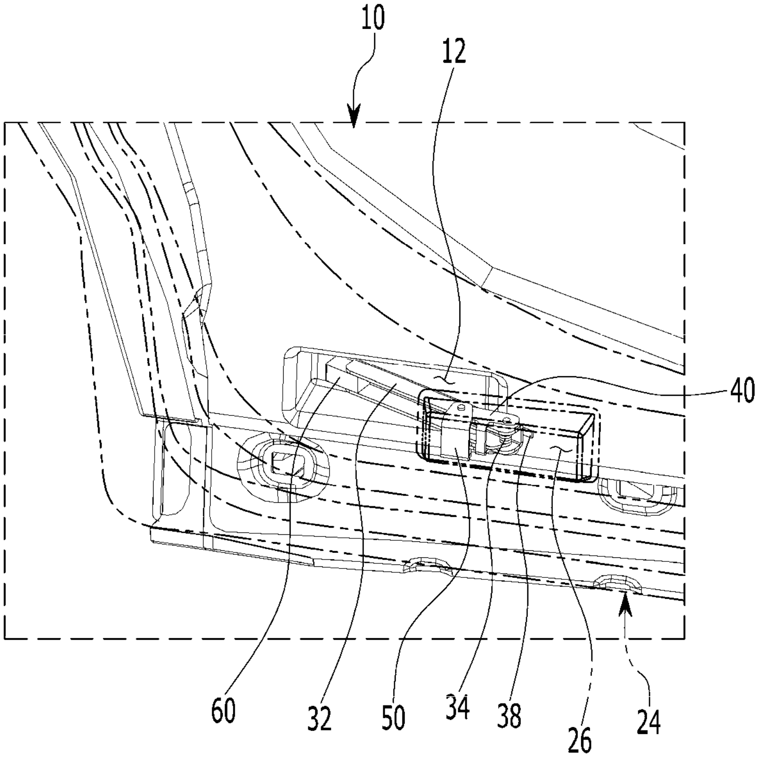
FIG. 9 is a perspective view showing the door closing state of the vehicle body to which a door closing impact absorber and a door mechanism including the same according to various exemplary embodiments of the present disclosure may be applied.
Figure 10:
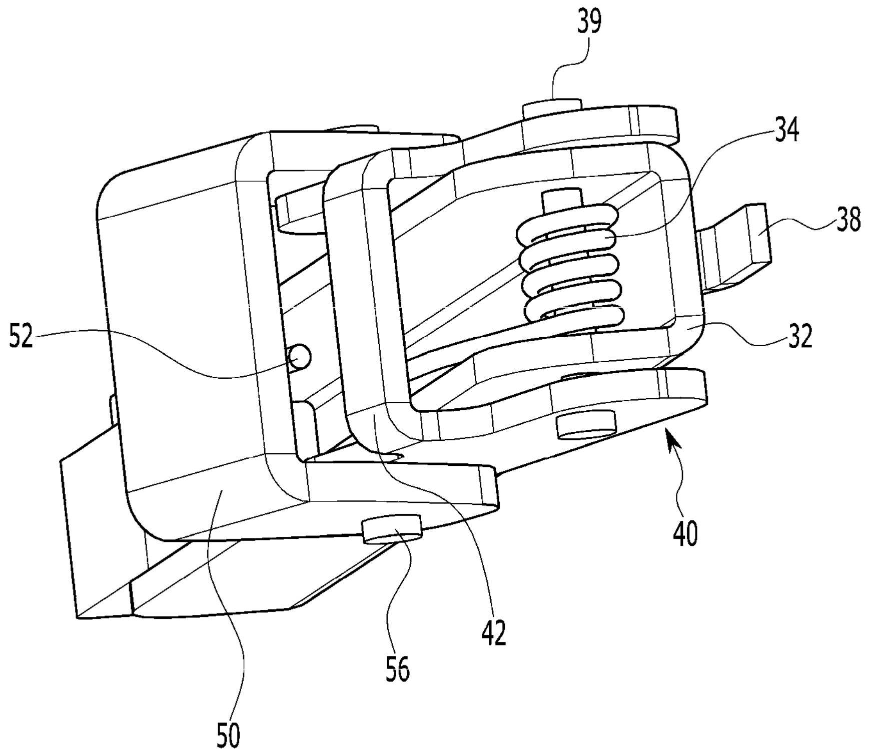
FIG. 10 is a perspective view showing the folded state of the door closing impact absorber according to various exemplary embodiments of the present disclosure.
Figure 11:
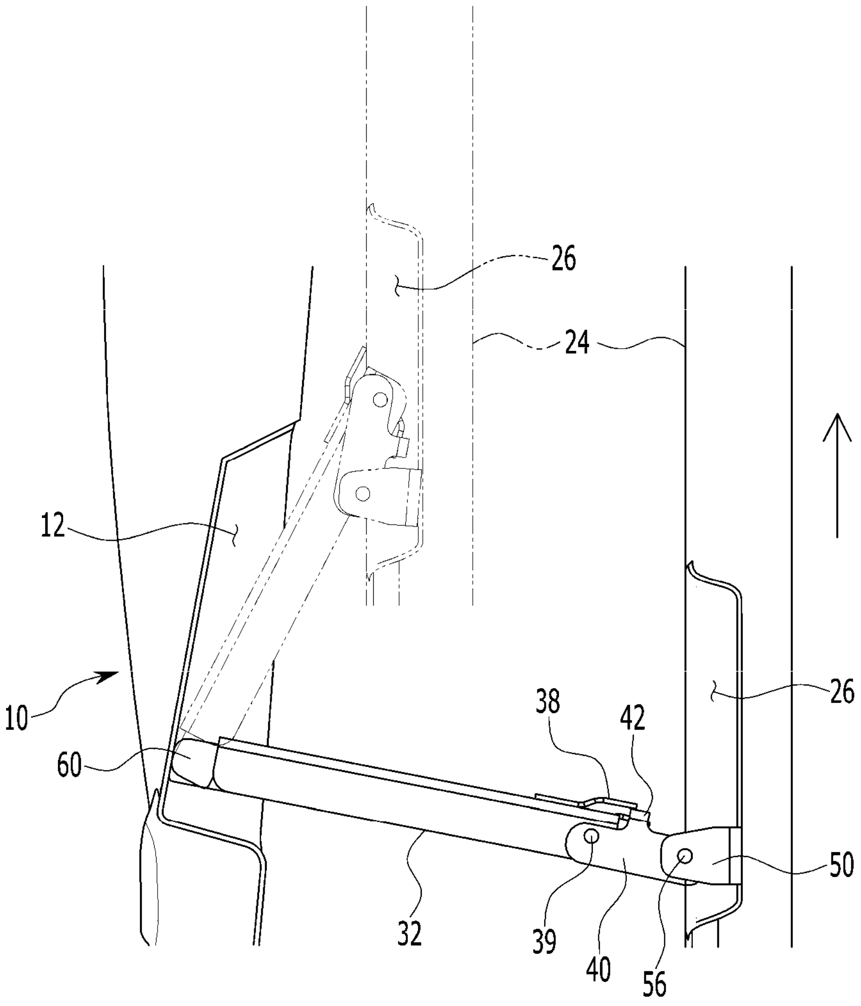
FIG. 11 is a drawing showing the operation of the door closing impact absorber and the door mechanism including the same according to various exemplary embodiments of the present disclosure.

FIG. 9 is a perspective view showing the door closing state of the vehicle body to which a door closing impact absorber and a door mechanism including the same according to various exemplary embodiments of the present disclosure may be applied, FIG. 10 is a perspective view showing the folded state of the door closing impact absorber according to various exemplary embodiments of the present disclosure, and FIG. 11 is a drawing showing the operation of the door closing impact absorber and the door mechanism including the same according to various exemplary embodiments of the present disclosure.

Referring to FIG. 5 to FIG. 11, the door mechanism according to various exemplary embodiments of the present disclosure may include the door closing impact absorber 30 according to various exemplary embodiments of the present disclosure described above.

The mounting bracket 50 may be mounted on the door 20, for example the rear door 24 shown in the drawing.

However, but is not limited thereto, when the door is closed, it is of course applicable to the front door 22 as a configuration to prevent the impact of the door and vehicle body.

The door mechanism according to various exemplary embodiments of the present disclosure may further include a door receiving groove 26 concave formed inside the door 20 so that the mounting bracket 50 is accommodated therein, That is, the mounting bracket 50 may be mounted to the rear door 24 through the door receiving groove 26.

The door receiving groove 26 may be formed in the lower portion of the door 20.

The door mechanism according to various exemplary embodiments of the present disclosure may further include a vehicle body receiving groove 12 formed concave inwardly of the vehicle body 10 and selectively contacting with the impact absorbing portion 60.

Just before the door 20 is closed, the impact absorbing portion 60 contacts with the vehicle body receiving groove 12 to absorb impact, and when the door 20 is completely closed, the door closing impact absorber 30 may be accommodated therein.

The main bracket 32 may rotate in the opposite direction to the sliding direction of the door 20 when the door 20 is closed.

The rotation bracket 40 may rotate in the sliding direction of the door 20 when the door 20 is closed.

That is, referring to FIG. 11, when the door 20, for example, the rear door 24 is closed, the rear door 24 moves to the front of the vehicle body 10, and the rotation bracket 40 rotates relative to the mounting bracket rotation shaft 56 in the forward direction of the vehicle body 10.

That is, the rotation bracket 40 rotates clockwise with respect to the mounting bracket rotation shaft 56.

When the door 20, for example the rear door 24, is closed, the rear door 24 moves forward of the vehicle body 10, and the main bracket 32 moves in the rear direction of the vehicle body 10 with respect to the main bracket rotation shaft 39.

That is, the main bracket 32 rotates anticlockwise with respect to the main bracket rotation shaft 39.

When the door 20, for example the rear door 24, is completely closed, the door closing impact absorber 30 may be accommodated in the vehicle body receiving groove 12 and the door receiving groove 26.

When the door 20, for example the rear door 24, is opened, the impact absorbing portion 60 pushes the vehicle body 10 by the main bracket torsion elasticity portion 34 and the mounting bracket torsion elasticity portion 52.

Accordingly, the door 20, for example, the rear door 24, may be easily opened even if the vehicle occupant does not use large force.

As described above, according to the door closing impact absorber and the door mechanism including the same according to various exemplary embodiments of the present disclosure, it is possible to prevent the shaking or vibration of the door by absorbing the impact when the opposing door is closed.

Furthermore, according to the door closing impact absorber and the door mechanism including the same according to various exemplary embodiments of the present disclosure, it is possible to suppress the noise generation by absorbing the impact when the opposing door is closed, so that it is possible to improve the merchantability.

Furthermore, according to the door closing impact absorber and the door mechanism including the same according to various exemplary embodiments of the present disclosure, when the door is opened, the door may be easily opened even if the vehicle occupant does not apply a large force.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door closing impact absorber comprising:
- a main bracket;
- a rotation bracket rotatably connected to a first end portion of the main bracket;
- a main bracket torsion elasticity portion coupling the main bracket and the rotation bracket to elastically support a relative rotation of the main bracket and the rotation bracket;
- a mounting bracket rotatably connected to the rotation bracket; and
- a mounting bracket torsion elasticity portion coupling the rotation bracket and the mounting bracket to elastically support a relative rotation of the rotation bracket and the mounting bracket; and
- a mounting bracket stopper for limiting the relative rotation of the rotation bracket and the mounting bracket,
- wherein the mounting bracket stopper is formed to integrally extend from the mounting bracket for limiting the relative rotation of the rotation bracket and the mounting bracket.

2. The door closing impact absorber of claim 1, further including a main bracket stopper for limiting the relative rotation of the main bracket and the rotation bracket.

3. The door closing impact absorber of claim 1, further including
- an impact absorbing portion mounted on a second end portion of the main bracket.

4. A door mechanism provided with the door closing impact absorber of claim 1.

5. The door mechanism of claim 4, further including
- a main bracket stopper for limiting the relative rotation of the main bracket and the rotation bracket.

6. The door mechanism of claim 4, wherein the mounting bracket is mounted on a door.

7. The door mechanism of claim 6, further including a door receiving groove concave formed inside the door so that the mounting bracket is accommodated therein.

8. A door mechanism provided with a door closing impact absorber, wherein the door closing impact absorber includes:

a main bracket;

a rotation bracket rotatably connected to a first end portion of the main bracket;

a main bracket torsion elasticity portion coupling the main bracket and the rotation bracket to elastically support a relative rotation of the main bracket and the rotation bracket;

a main bracket stopper for limiting the relative rotation of the main bracket and the rotation bracket;

a mounting bracket rotatably connected to the rotation bracket;

a mounting bracket torsion elasticity portion coupling the rotation bracket and the mounting bracket to elastically support a relative rotation of the rotation bracket and the mounting bracket; and a door receiving groove formed concave inside a door so that the mounting bracket is accommodated therein, wherein the mounting bracket is mounted on the door, wherein the door receiving groove is formed at a lower portion of the door.

9. The door mechanism of claim 4, further including an impact absorbing portion mounted on a second end portion of the main bracket.

10. A door mechanism provided with a door closing impact absorber, wherein the door closing impact absorber includes:

a main bracket;

a rotation bracket rotatably connected to a first end portion of the main bracket;

a main bracket torsion elasticity portion coupling the main bracket and the rotation bracket to elastically support a relative rotation of the main bracket and the rotation bracket;

an impact absorbing portion mounted on a second end portion of the main bracket; and a vehicle body receiving groove formed concave inwardly of a vehicle body and selectively contacting with the impact absorbing portion.

11. The door mechanism of claim 6, wherein the main bracket rotates in a direction opposite to a sliding direction of the door when the door is closed.

12. The door mechanism of claim 6, wherein the rotation bracket rotates in the sliding direction of the door when the door is closed.

13. The door mechanism of claim 6, wherein the door is an opposite door or an opposite swing door.

14. The door mechanism of claim 6, wherein the door is a rear door.

* * * * *